US012627743B2

(12) United States Patent
Jayaramachar et al.

(10) Patent No.: US 12,627,743 B2
(45) Date of Patent: May 12, 2026

(54) METHODS, SYSTEMS, AND COMPUTER READABLE MEDIA FOR PROVIDING FOR EFFICIENT AUDITING OF NETWORK FUNCTION (NF) PROFILES BY SERVICE COMMUNICATION PROXIES (SCPS)

(71) Applicant: Oracle International Corporation, Redwood Shores, CA (US)

(72) Inventors: Amarnath Jayaramachar, Bangalore (IN); Yesh Goel, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 9 days.

(21) Appl. No.: 18/637,423

(22) Filed: Apr. 16, 2024

(65) Prior Publication Data

US 2025/0323980 A1 Oct. 16, 2025

(51) Int. Cl.
*H04L 67/51* (2022.01)
*H04L 41/122* (2022.01)
(Continued)

(52) U.S. Cl.
CPC ............ *H04L 67/51* (2022.05); *H04L 41/122* (2022.05); *H04L 69/28* (2013.01); *H04L 67/568* (2022.05); *H04L 2463/121* (2013.01)

(58) Field of Classification Search
None
See application file for complete search history.

(56) References Cited

U.S. PATENT DOCUMENTS 10,833,938 B1 * 11/2020 Rajput .................... H04L 67/30
2024/0064197 A1 * 2/2024 Rodrigo ................. H04L 67/51

FOREIGN PATENT DOCUMENTS

EP           3855705 A1 * 7/2021 ............. H04L 67/51
WO     WO-2025017590 A1 * 1/2025 ........... H04L 67/568

OTHER PUBLICATIONS

"3rd Generation Partnership Project; Technical Specification Group Core Network and Terminals; 5G System; Network Function Repository Services; Stage 3 (Release 18)", 3GPP TS 29.510, V18.6.0 (Mar. 2024).

(Continued)

*Primary Examiner* — Lance Leonard Barry
(74) *Attorney, Agent, or Firm* — Jenkins, Taylor & Hunt, P.A.

(57) ABSTRACT

Methods, systems, and computer readable media for providing for efficient auditing of NF profiles by SCPs are described. One method includes storing, by an NRF, NF profiles of producer NFs and associated last update timestamps and providing, by the NRF, a timestamp-based NF profile retrieval API that receives, as input, a timestamp, and that provides, as output, NF profiles having last update timestamps that indicate times after a time indicated by the timestamp received as input. The method further includes receiving, by the NRF and from an SCP, a request message via the timestamp-based NF profile retrieval API and that includes a first timestamp. The method further includes generating, by the NRF, a response message that includes NF profiles for which last update timestamps indicate times that are after a time indicated by the first timestamp. The method further includes transmitting the response message from the NRF to the SCP.

20 Claims, 10 Drawing Sheets

(51) Int. Cl.
    *H04L 67/568*      (2022.01)
    *H04L 69/28*      (2022.01)

(56)          References Cited

OTHER PUBLICATIONS

"3rd Generation Partnership Project; Technical Specification Group Services and System Aspects; System architecture for the 5G System (5GS); Stage 2 (Release 18)", 3GPP TS 23.501, V18.5.0 (Mar. 2024).

* cited by examiner

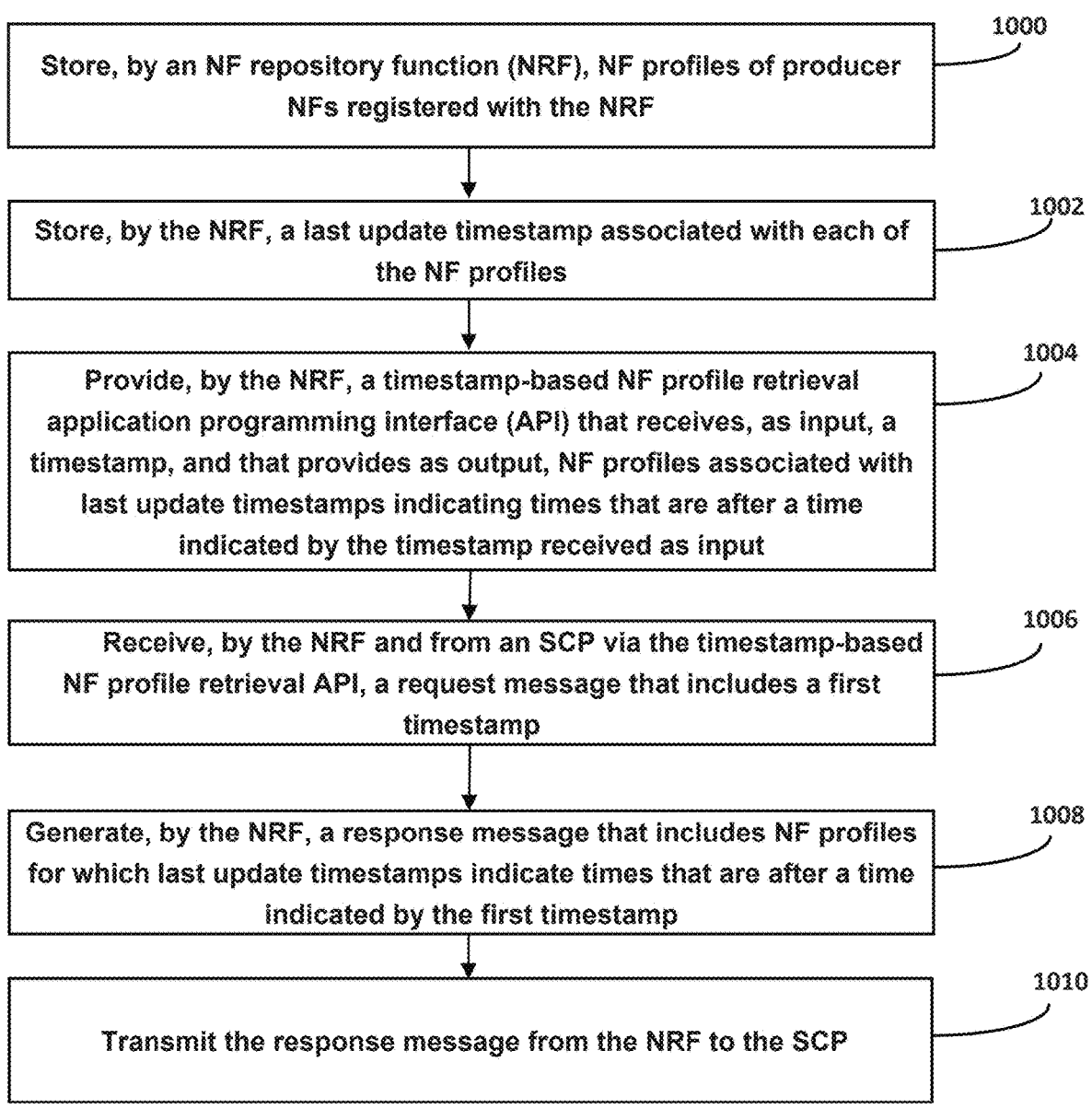

Store, by an NF repository function (NRF), NF profiles of producer NFs registered with the NRF — 1000

Store, by the NRF, a last update timestamp associated with each of the NF profiles — 1002

Provide, by the NRF, a timestamp-based NF profile retrieval application programming interface (API) that receives, as input, a timestamp, and that provides as output, NF profiles associated with last update timestamps indicating times that are after a time indicated by the timestamp received as input — 1004

Receive, by the NRF and from an SCP via the timestamp-based NF profile retrieval API, a request message that includes a first timestamp — 1006

Generate, by the NRF, a response message that includes NF profiles for which last update timestamps indicate times that are after a time indicated by the first timestamp — 1008

Transmit the response message from the NRF to the SCP — 1010

FIG. 10

METHODS, SYSTEMS, AND COMPUTER READABLE MEDIA FOR PROVIDING FOR EFFICIENT AUDITING OF NETWORK FUNCTION (NF) PROFILES BY SERVICE COMMUNICATION PROXIES (SCPS)

TECHNICAL FIELD

The subject matter described herein relates to synchronizing NF profile information between an NRF and an SCP. More particularly, the subject matter described herein relates to methods, systems, and computer readable media for providing for efficient auditing of NF profiles by SCPs.

BACKGROUND

In 5G telecommunications networks, a network function that provides service is referred to as a producer NF or service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

One problem that can occur in 5G and subsequent generation networks relates to inefficiencies in the processes by which SCPs obtain NF profile information from an NRF. An SCP needs to learn network topology information from the NRF in order to route messages to producer NF instances. SCPs obtain NF topology information from the NRF using the NF discovery service operation, through periodic auditing of NF profiles, and through subscriptions with the NRF. Producer NF instances update their NF profiles with the NRF when changes in producer NF loading or changes in the NF profiles occur.

Due to the dynamic nature of NF profiles, SCPs maintain a cache of NF profiles and periodically audit the NRF to keep the NF profile information in the cache synchronized with the NF profile information stored with the NRF. The audit procedure is a brute force procedure in which the SCP uses a list retrieval application programming interface (API) to obtain a list of NF profiles registered with the NRF, followed by a profile retrieval API to obtain the NF profiles whose identities were learned using the list retrieval API. The NRF, in response to a request sent via the profile retrieval API, sends all of the requested NF profiles to the SCP, even though the SCP may already have current information for some of the NF profiles. Sending unnecessary NF profile information across the network wastes network bandwidth and processing resources of the NRF and the SCP.

Accordingly, in light of these and other difficulties, there exists a need for improved methods, systems, and computer readable media for providing for efficient auditing of NF profile information by SCPs.

SUMMARY

A method for providing for efficient auditing of network function (NF) profiles by service communication proxies (SCPs) includes storing, by an NF repository function (NRF), NF profiles of producer NFs registered with the NRF. The method further includes storing, by the NRF, last update timestamps associated with the NF profiles. The method further includes providing, by the NRF, a timestamp-based NF profile retrieval application programming interface (API) that receives, as input, a timestamp, and that provides, as output, NF profiles associated with last update timestamps that indicate times that are after a time indicated by the timestamp received as input. The method further includes receiving, by the NRF and from an SCP via the timestamp-based NF profile retrieval API, a request message that includes a first timestamp. The method further includes generating, by the NRF, a response message that includes NF profiles for which last update timestamps indicate times that are after a time indicated by the first timestamp. The method further includes transmitting the response message from the NRF to the SCP.

According to another aspect of the subject matter described herein, storing the last update timestamps includes storing the last update timestamps in an NRF cache.

According to another aspect of the subject matter described herein, the method for providing for efficient auditing of NF profiles by SCPs includes maintaining, by the NRF, a plurality of load buckets for the producer NFs registered with the NRF and updating the last update timestamps associated with the NF profiles when changes in loading of the producer NFs cause load values of the producer NFs to move between ranges of loading associated with the load buckets.

According to another aspect of the subject matter described herein, maintaining the load buckets includes maintaining different ranges of loading per NF type.

According to another aspect of the subject matter described herein, the method for providing for efficient auditing of NF profiles by SCPs includes refraining from updating the last update timestamps associated with the producer NFs in response to changes in loading of the producer NFs that do not cause the load values to move between ranges of loading associated with the load buckets.

According to another aspect of the subject matter described herein, the method for providing for efficient auditing of NF profiles by SCPs includes updating the last update timestamps in response to NF profile updates from the producer NFs.

According to another aspect of the subject matter described herein, providing the timestamp-based NF profile retrieval API includes providing a custom representational state transfer (REST) API.

According to another aspect of the subject matter described herein, receiving a request message via the timestamp-based NF profile retrieval API includes receiving a message including a hypertext transfer protocol (HTTP) GET method with the first timestamp as a query parameter.

According to another aspect of the subject matter described herein, the first timestamp indicates a time of a last audit request by the SCP.

According to another aspect of the subject matter described herein, generating the response message comprises including, in the response message, only the NF profiles of the producer NFs for which the last update timestamps indicate times that are after a time indicated by the first timestamp.

According to another aspect of the subject matter described herein, a system for providing for efficient auditing of network function (NF) profiles by service communication proxies (SCPs) is provided. The system includes an NF repository function (NRF) including at least one processor and a memory. The system further includes an NF profiles database embodied in the memory for storing NF profiles of producer NFs registered with the NRF. The system further includes an NF profiles data manager implemented by the at least one processor for storing last update timestamps associated with the NF profiles, providing a timestamp-based NF profile retrieval application programming interface (API) that receives, as input, a timestamp, and that provides, as output, NF profiles associated with last update timestamps that indicate times that are after a time indicated by the timestamp received as input, the NF profiles data manager for receiving, from an SCP, a request message via the timestamp-based NF profile retrieval API and that includes a first timestamp, generating a response message that includes NF profiles for which last update timestamps indicate times that are after a time indicated by the first timestamp, and transmitting the response message to the SCP.

According to another aspect of the subject matter described herein, the NF profiles data manager is configured to store the last update timestamps in an NRF cache.

According to another aspect of the subject matter described herein, the NF profiles data manager is configured to maintain a plurality of load buckets for the producer NFs registered with the NRF and update the last update timestamps associated with the NF profiles when changes in loading of the producer NFs cause load values of the producer NFs to move between ranges of loading associated with the load buckets.

According to another aspect of the subject matter described herein, the NF profiles data manager is configured to maintain different ranges of loading per NF type.

According to another aspect of the subject matter described herein, the NF profiles data manager is configured to refrain from updating the last update timestamps associated with the producer NFs in response to changes in loading of the producer NFs that do not cause the load values to move between ranges of loading associated with the load buckets.

According to another aspect of the subject matter described herein, the NF profiles data manager is configured to update the last update timestamps in response to NF profile updates from the producer NFs.

According to another aspect of the subject matter described herein, the timestamp-based NF profile retrieval API includes a custom representational state transfer (REST) API.

According to another aspect of the subject matter described herein, the request message received via the timestamp-based NF profile retrieval API includes a hypertext transfer protocol (HTTP) GET method with the first timestamp as a query parameter.

According to another aspect of the subject matter described herein, a non-transitory computer readable medium having stored thereon executable instructions that when executed by a processor of a computer control the computer to perform steps is provided. The steps include storing, by a network function (NF) repository function (NRF), NF profiles of producer NFs registered with the NRF. The steps further include storing, by the NRF, last update timestamps associated with the NF profiles. The steps further include providing, by the NRF, a timestamp-based NF profile retrieval application programming interface (API) that receives, as input, a timestamp, and that provides, as output, NF profiles associated with last update timestamps that indicate times that are after a time indicated by the timestamp received as input. The steps further include receiving, by the NRF and from a service communication proxy (SCP), a request message via the timestamp-based NF profile retrieval API and that includes a first timestamp. The steps further include generating, by the NRF, a response message that includes NF profiles for which last update timestamps indicate times that are after a time indicated by the first timestamp. The steps further include transmitting the response message from the NRF to the SCP.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which:

FIG. 10 is a flow chart illustrating an exemplary process for providing for efficient auditing of NF profile information by SCPs.

DETAILED DESCRIPTION

Figure 1:
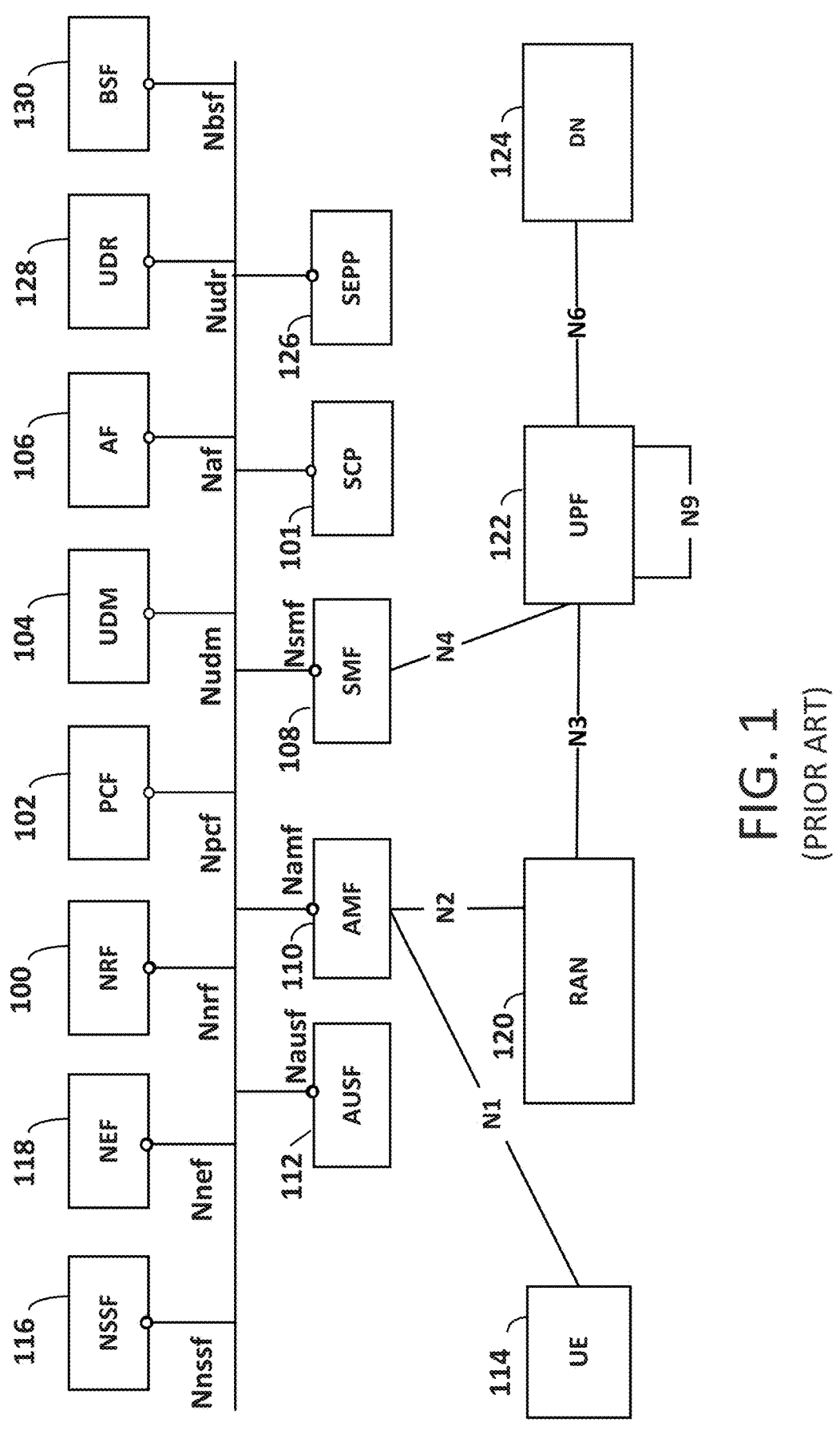
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

A SEPP 126 filters incoming traffic from another PLMN and can perform topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A SEPP filtering egress messages from consumer NFs in a PLMN is referred to as a consumer SEPP or C-SEPP. A SEPP that filters ingress messages directed to consumer NFs in a PLMN is referred to as a producer SEPP or P-SEPP. A given SEPP can function as a C-SEPP and a P-SEPP, depending on the role of the SEPP.

A unified data repository (UDR) 128 stores subscription data for UEs. A binding support function (BSF) 130 manages bindings between PDU sessions and PCFs.

As described above, one problem that can occur in 5G and subsequent generation networks is inefficiency in maintaining updated NF profile information at an SCP. NF producers are bootstrapped with the NRF to register their NF profiles and send NF heart-beat request messages, which can carry updated NF profile information, to the NRF. The NRF also accepts subscriptions from subscribing NFs that are interested in NF producer registrations and updates. NF producers update their NF profiles if there is any change to NF profile data. When an NF profile update occurs, the NRF triggers notifications to subscribing NFs associated with matching subscriptions.

As per 3GPP TS 23.501, the SCP is the routing proxy between NF consumers and NF producers for 3GPP communication model C and model D deployments. The SCP learns the network topology from the NRF. 3GPP TS 29.510 defines methods for topology learning, including NF discovery for initial learning and subscriptions and notifications to learn of NF profile updates.

The SCP relies on notification data from the NRF to keep the SCP's cache updated. Because some of the procedures by which the SCP updates its local cache utilize a pull mechanism, there is a high likelihood that the notifications can be lost due to network issues, and the NF profile information cached by the SCP will be stale. Stale NF profile information at the SCP may result in service outages/latency due to the SCP attempting to route messages to incorrect/unavailable NF producers.

Because the SCP does not know which producer NFs have updated their NF profiles with the NRF in a given period of time, the SCP may sync the data in its cache periodically for all of the NF registration/profiles that NF producers have registered with the NRF. The 3GPP standard method used by the SCP to audit NF profile information maintained by the NRF is the list retrieval API, followed by the profile retrieval API. The list retrieval and profile retrieval APIs are brute force methods where the SCP triggers list retrieval and profile retrieval requests for all the NF producers in the network. These methods are inefficient, as they cause an increased number of messages in the network, an increased quantity of data flowing in the network, and increased utilization of processing resources of the NRF and the SCP.

To address these difficulties, the NRF maintains a last update timestamp for NF profile information. The last update timestamp is a new field in the NRF cache associated with each NF profile/registration stored by the NRF. The NRF also exposes a custom representational state transfer (REST) API, referred to herein as the timestamp-based NF profile retrieval API, which will accept a timestamp as input and respond with only the NF profiles that were modified after the timestamp received via the custom API. The SCP may periodically invoke the REST API exposed by the NRF to audit NF profiles maintained by the NRF. In an NF profile audit request message sent according to the timestamp-based NF profile retrieval API, the timestamp included by the SCP may be equal to the previous audit cycle timestamp. In response to receiving an audit request via the timestamp-based NF profile retrieval API, the NRF will perform a lookup using the timestamp received in the audit request, locate NF profiles modified after the timestamp received in the audit request, include the NF profiles in an audit response, and transmit the audit response to the SCP. The SCP processes the incoming audit response by updating the NF profiles in the cache maintained by the SCP. The NF profile data will be synced with the NRF data even if there is a notification drop due to network issues/congestion. The likelihood of a service outage/latency due to the SCP trying to route a request to incorrect or unavailable NF producers is also reduced. An efficient auditing mechanism between the SCP and the NRF is achieved by a reduced message flow in the network, by a reduced quantity of data in the network, and by reduced processing and hence reduced resource utilization at the NRF and the SCP. In one implementation, only the NF profiles of NF service producers that are substantially updated since the time indicated by the timestamp in the audit request message are communicated to the SCP in the audit response message.

Figure 2:
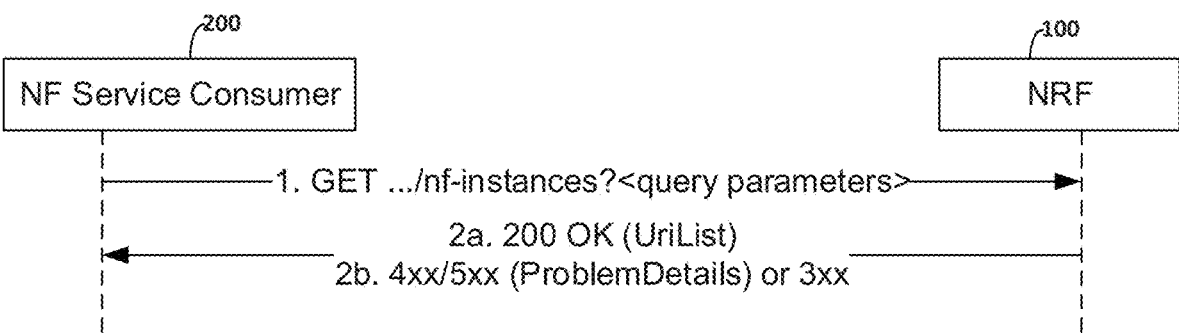
FIG. 2 is a message flow diagram illustrating exemplary messages exchanged in obtaining a list of uniform resource identifiers (URIs) of producer NFs registered with an NRF.

FIG. 2 is a message flow diagram illustrating exemplary messages exchanged in obtaining a list of URIs of producer NFs registered with an NRF. The message flow illustrated in FIG. 2 is part of the Nnrf_NFManagement service operation defined in 3GPP TS 29.510 by which an NF service consumer can query the NRF for a list of URIs corresponding to NF instances registered with the NRF. According to Section 6.1.3.1 of 3GPP TS 29.510, a consumer NF can query the NRF using a message with an HTTP GET method and the nf-instances attribute, and the NRF will return a list of URIs of producer NFs registered with the NRF. Referring to the message flow in FIG. 2, in step 1, consumer NF 200 sends a message with an HTTP GET method and the nf-instances attribute to NRF 100. If NRF 100 successfully processes the request, NRF 100 responds as indicated in step 2a with a 200 OK message including a list of URIs of producer NFs registered with NRF 100. If NRF 100 does not successfully process the request or the request is redirected, NRF 100 responds as indicated in step 2b with a 4xx or 5xx message indicating problem details or a 3xx message indicating redirection.

Figure 3:
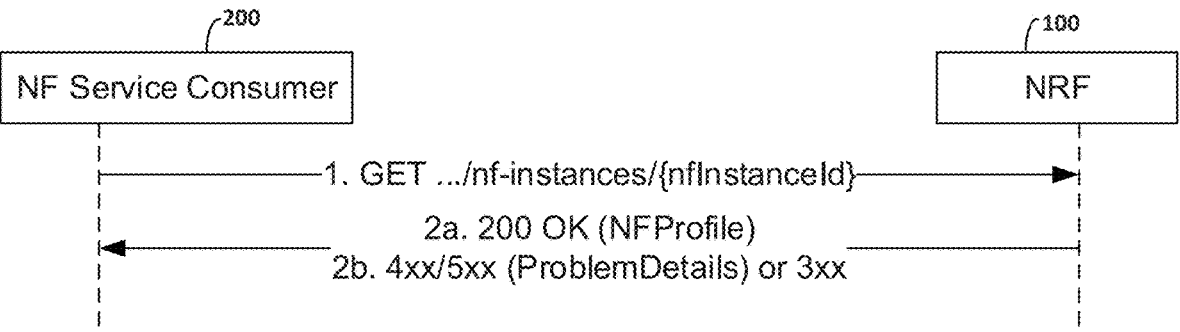
FIG. 3 is a message flow diagram illustrating exemplary messages exchanged in retrieving NF profiles from the NRF.

Once the SCP obtains the list of URIs of producer NFs registered with the NRF, the SCP can query the NRF for the NF profiles corresponding to the URIs obtained using the list retrieval API. FIG. 3 is a message flow diagram illustrating exemplary messages exchanged in retrieving NF profiles from the NRF. Referring to the message flow in FIG. 3, in step 1, consumer NF 200 sends, to NRF 100, a message with an HTTP GET method, the nf-instances attribute, and the list of URIs obtained using the list retrieval API. If NRF 100 successfully processes the request, NRF 100 responds as indicated in step 2a with a 200 OK message including the NF profiles of all producer NFs registered with NRF 100. If NRF 100 does not successfully process the request or the request is redirected, NRF 100 responds as indicated in step 2b with a 4xx or 5xx message indicating problem details or a 3xx message indicating redirection.

Figure 4:
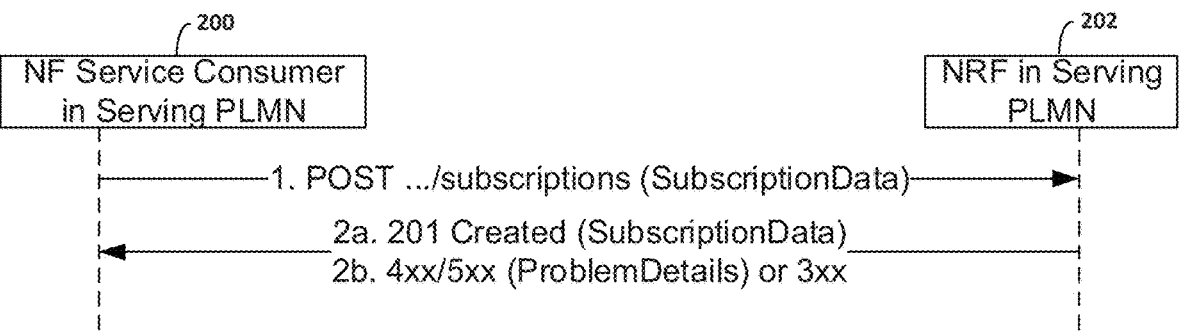
FIG. 4 is a message flow diagram illustrating exemplary messages exchanged in creating a subscription with the NRF.

In addition to the list and profile retrieval APIs, the SCP can also utilize the NFStatusSubscribe API to update the NF profile information maintained by the SCP. FIG. 4 is a message flow diagram illustrating exemplary messages exchanged in creating a subscription with the NRF using the NFStatusSubscribe service operation. Referring to the message flow in FIG. 4, in step 1, consumer NF 200 sends a message with an HTTP POST method and subscription data to NRF 100. If NRF 100 successfully processes the request, NRF 100 creates the subscription and responds as indicated in step 2a with a 201 Created message confirming successful creation of the subscription. If NRF 100 does not successfully process the request or the request is redirected, NRF 100 responds as indicated in step 2b with a 4xx or 5xx message indicating problem details or a 3xx message indicating redirection.

Once the subscription is created, NRF 100 notifies NF service consumer 200 when NF profiles within the subscription are updated. However, because subscription notifications may be lost, the above-described list and profile retrieval APIs are used to pull NF profile data from the NRF.

Figure 5:
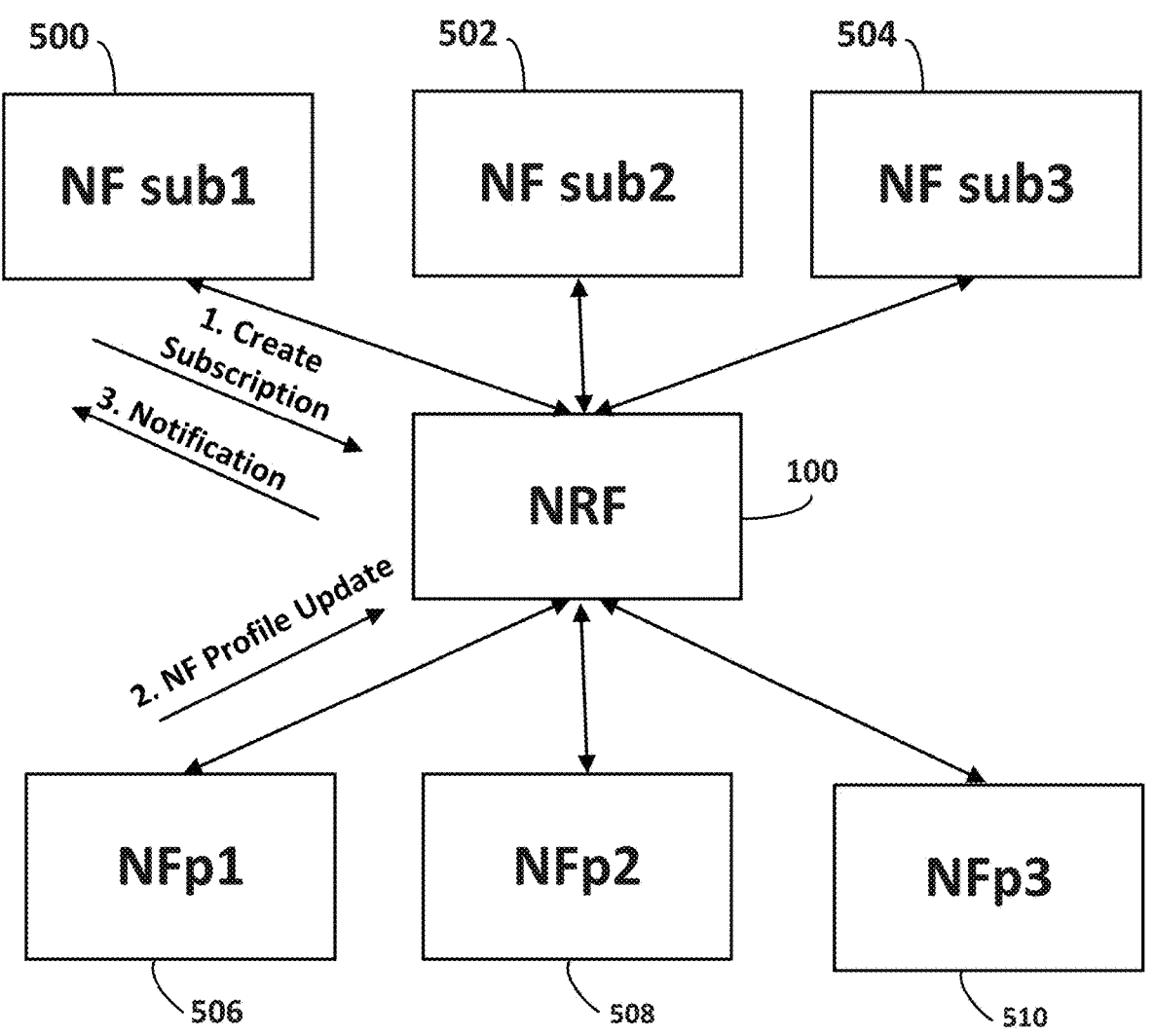
FIG. 5 is a network diagram illustrating updating of NF profile information with the NRF and communicating the NF profile information to a subscribing NF.

FIG. 5 is a network diagram illustrating updating of NF profile information with the NRF and communicating the updated information to subscribing NFs. Referring to FIG. 5, NF service consumers 500, 502, and 504 are configured to obtain NF profile information regarding NF service producers 506, 508, and 510 from NRF 100. In step 1, NF service consumer 500 subscribes with NRF 100 to receive notifications of updates to the NF profile of NF service producer 506. In step 2, NF service producer 506 updates its NF profile with NRF 100. In step 3, NRF 100 sends the updated NF profile of NF service producer 506 to NF service consumer 500.

Figure 6:
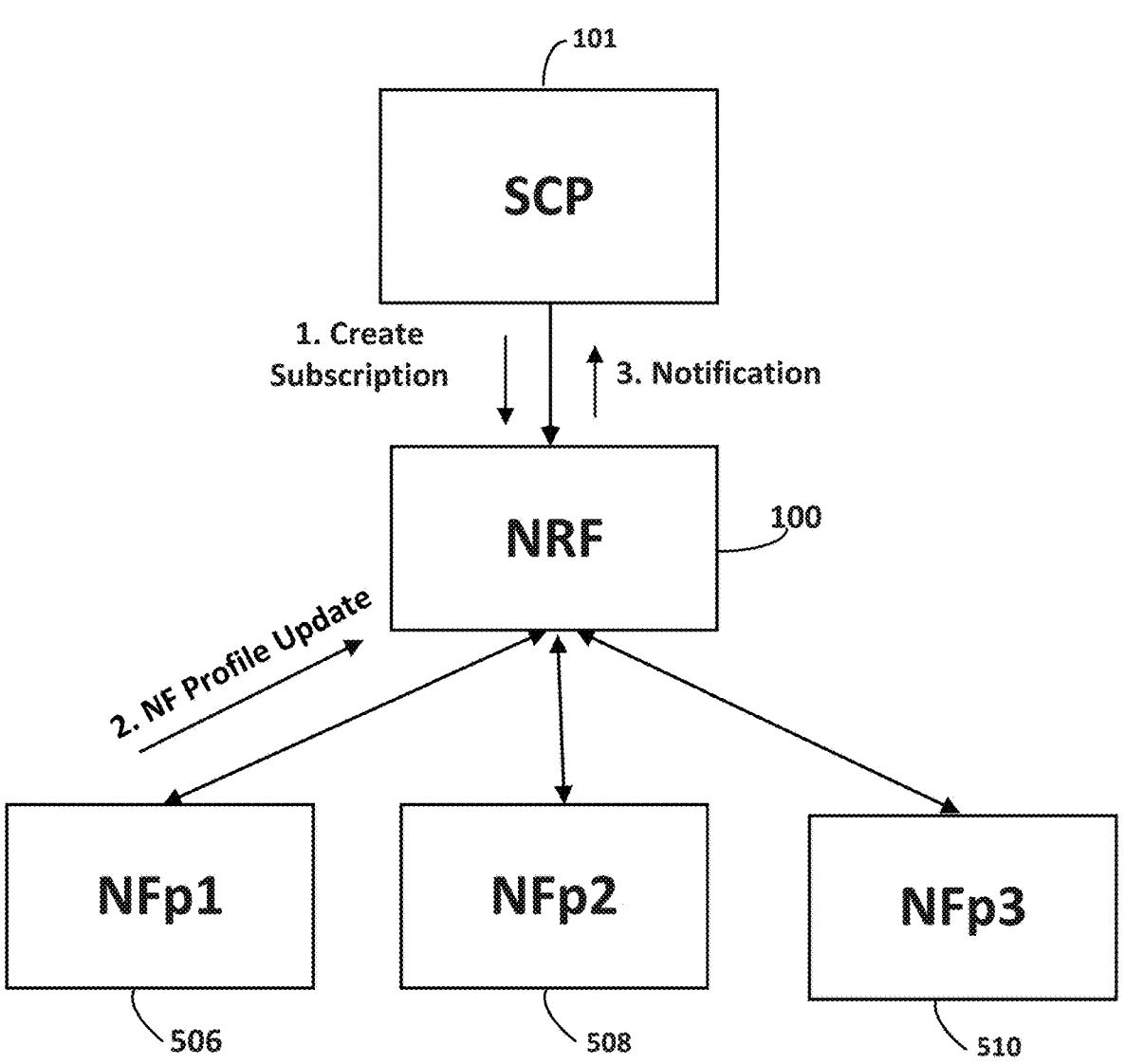
FIG. 6 is a network diagram illustrating updating of NF profile information and communicating the NF profile information to an SCP.

The SCP can function as an NF service consumer and subscribe to receive updated NF profile information from the NRF. FIG. 6 is a network diagram illustrating a notification failure between the NRF and the SCP and the SCP auditing the NRF for NF profile information. Referring to FIG. 6, in step 1, SCP 101 subscribes with NRF 100 to receive notifications of updates to NF profiles of NF service producer 506. In step 2, NF service producer 506 updates its NF profile with NRF 100. In step 3, NRF 100 sends the updated NF profile of NF service producer 506 to SCP 101.

As per 3GPP TS 23.501, the SCP is the routing proxy between NF consumers and NF producers for model C and model D deployments. The SCP learns the network topology from the NRF. 3GPP TS 29.510 defines the following methods that can be used by the SCP for NF topology learning:

NF discovery—for initial learning; and

Subscription and notification—for registration/profile updates.

The SCP maintains a cache of NF profile information obtained from the NRF. The SCP can use the above-described list retrieval and profile retrieval APIs to keep its cache updated. However, the caching procedure is inefficient, and NF profile subscription notification messages can be lost.

Figure 7:
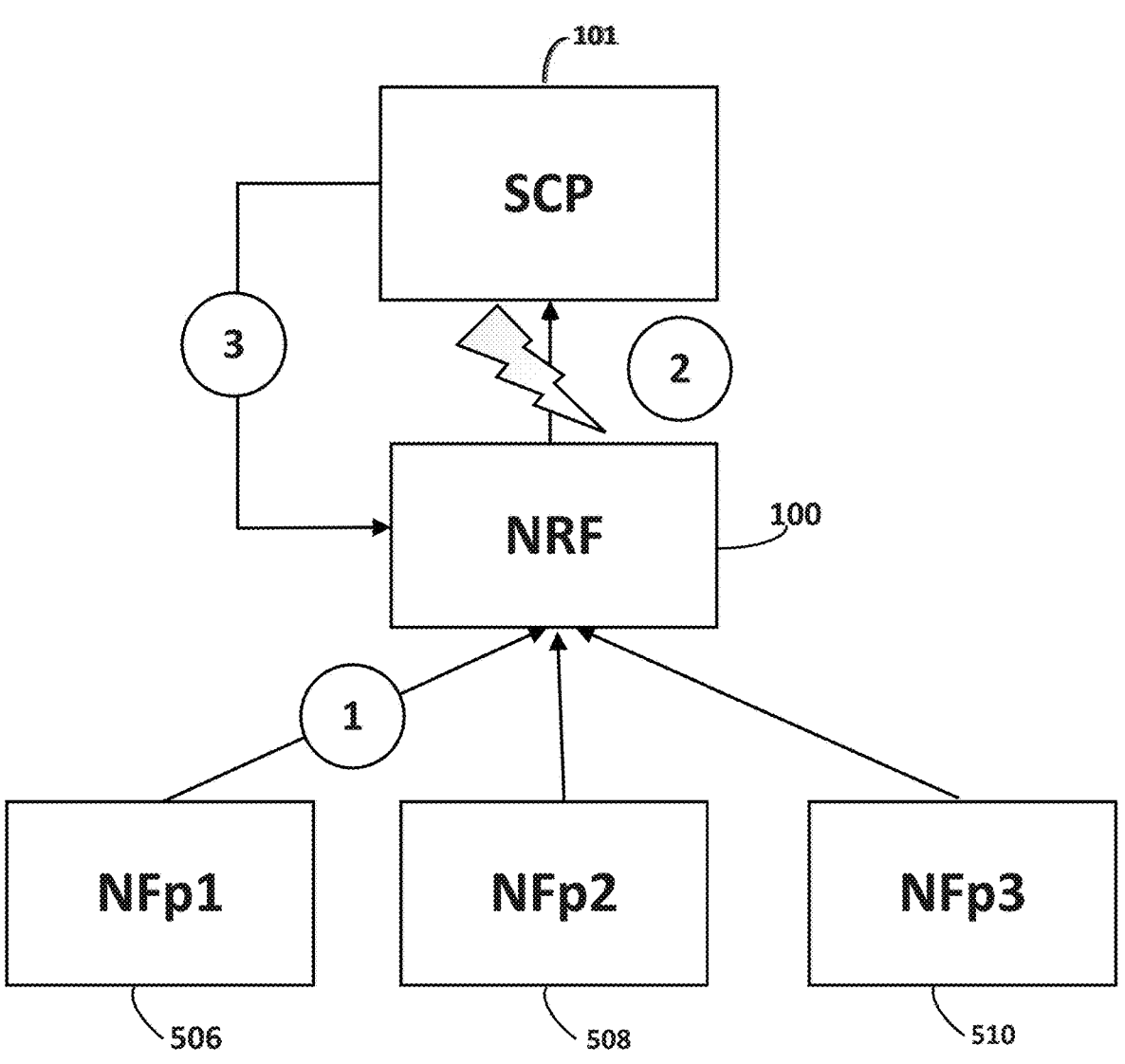
FIG. 7 is a network diagram illustrating a notification failure and an auditing of NF profile information by an SCP.

FIG. 7 is a network diagram illustrating a lost notification message and auditing of NF profile information by an SCP. In FIG. 7, in step 1, producer NF 506 updates its NF profile information with NRF 100. In step 2, NRF 100 attempts to notify SCP 101 of the NF profile update, but the notification is lost. In step 3, SCP 101 pulls the NF profile information from NRF 100 using the list retrieval and profile retrieval APIs.

The SCP relies on notification data from the NRF to keep its cache updated. There is a high likelihood that at least some of the notifications from the NRF are lost due to network issues, and the NF producer data in the SCP will become stale. As a result, there will be service outages/latency due to the SCP trying to route to incorrect or unavailable NF producers. Because the SCP does not know which NF producers have updated their NF profiles in the NRF for the previous periodic cycle, the SCP may sync the data for all the NF registrations/profiles of NF producers registered with the NRF. The 3GPP-defined standard method to use is list retrieval followed by profile retrieval, which is a brute-force method. Brute-force NF list and NF profile retrieval may lead to an increased number of messages in the network and increased utilization of processing resources at the NRF and the SCP.

As indicated above, the NRF maintains a last update timestamp for each of the NF profiles registered in the NF profiles database of the NRF. The last update timestamp is a new field in the NRF cache associated with each NF profile/registration stored. The NRF exposes the timestamp-based NF profile retrieval API, which may be implemented as a custom REST API, and which will accept a timestamp as input and respond with NF profiles that were updated since a time indicated by the timestamp included in the audit request.

The SCP may periodically invoke the REST API exposed by the NRF to audit the NF profile data maintained by the NRF. In each audit request, the SCP may include a timestamp that indicates the time of the previous audit of the NF profile data using the timestamp-based NF profile retrieval API. For example, if the first audit cycle is conducted at time $T_N$ with a timestamp equal to $T_N$, the audit cycle that occurs at time $T_{N+1}$ will be conducted with a timestamp equal to $T_N$, the audit cycle that occurs at $T_{N+2}$ will be conducted with a timestamp equal to $T_{N+1}$, etc.

In response to receiving an audit request including the timestamp attribute, the NRF performs a lookup for the NF profiles modified since the time indicated by the timestamp received in the audit request. The NRF constructs a response with the updated NF profiles and sends the response to the SCP. The SCP processes the incoming audit response by updating the list of NF profiles/registrations within its local cache.

Figure 8:
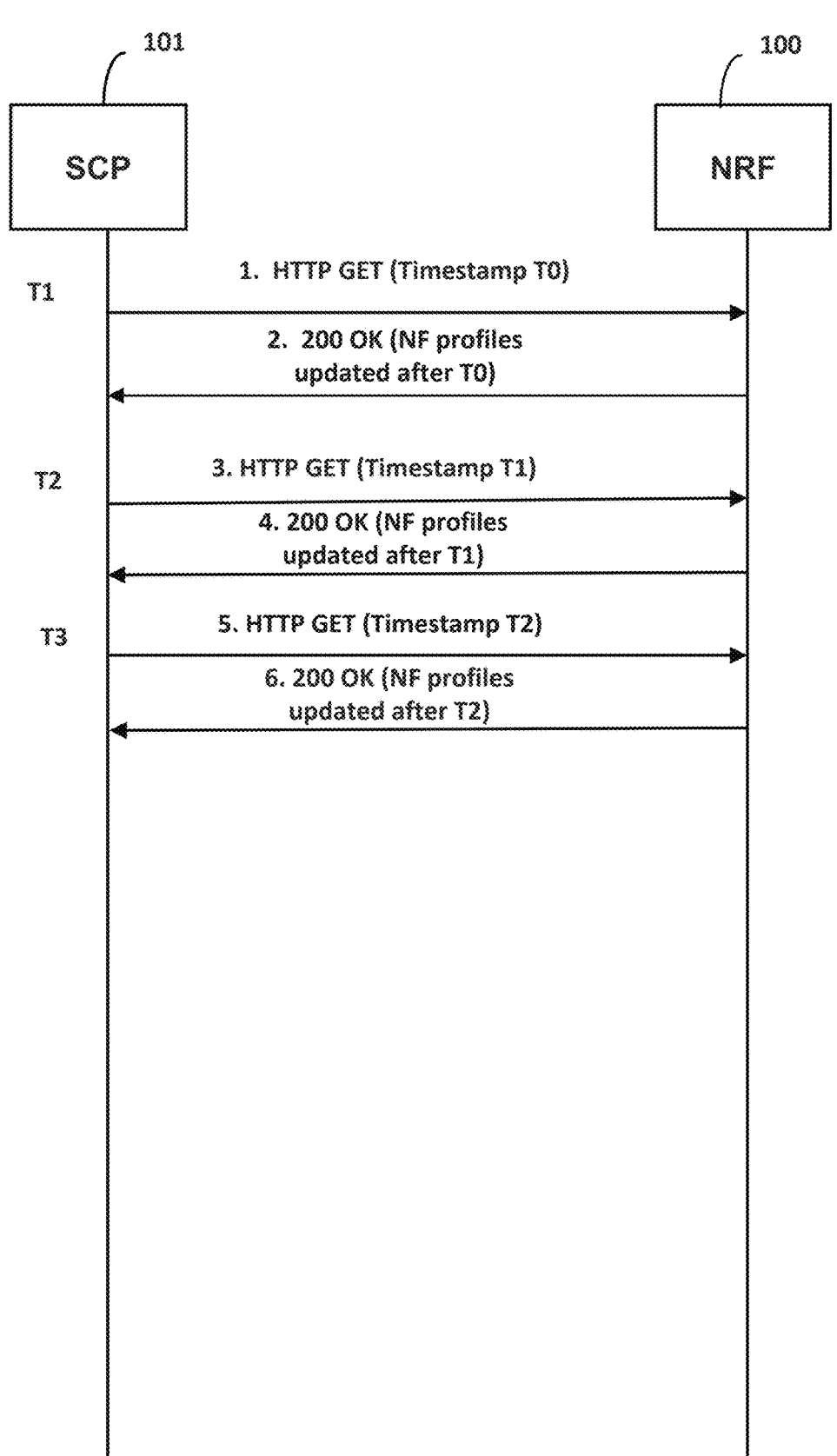
FIG. 8 is a message flow diagram illustrating the storing of a last update timestamp with the SCP and the use of the last update timestamp to limit NF profile information provided to the SCP in response to an audit procedure.

FIG. 8 is a message flow diagram illustrating the storing of a last update timestamp with the NRF and the use of the last update timestamp to limit NF profile information provided to the SCP in response to an audit procedure. Referring to FIG. 8 at time T1, in step 1, SCP 101 sends an initial HTTP GET message to NRF 100. The HTTP GET message is sent according to the new timestamp-based NF profile retrieval API and includes the timestamp T0, which is the time of the last update from NRF 100. In step 2, NFR 100 responds with a 200 OK message including the NF profiles updated after time T0. NF profiles that have not been updated since time T0 are excluded from the response. Thus, the procedure increases the efficiency over the prior NF protocol profile list retrieval and profile retrieval service operations. At time T2, SCP 101 sends another HTTP GET message with the timestamp T1. NRF 100 receives the HTTP GET message and responds in step 4 with all of the NF profiles updated since time T1. At time T3, SCP 101 sends another HTTP GET message with timestamp T2. NRF 100 responds in step 6 with all of the NF profiles updated since time T2 the process may continue so that SCP 101 can maintain and NF profiles cache that is synchronized with the NF profile data of NRF 100 without requiring transmission across the network of NF profiles that have not been updated.

To support NF profile audits using the timestamp-based NF profile retrieval API, the SCP may be configured with a periodicity value that controls the periodicity of the audit cycle. The NRF may be configured with load buckets that include ranges of load values, and the NRF may refrain from updating the last update timestamp for an NF profile unless a change in the load value associated with an NF profile causes the load value to cross one of the ranges of loading associated with a load bucket.

The NF profile update is a rare event in the network when compared to NF load updates received in NF heart-beat request messages. In one example, load buckets may be configured at the NRF per NF type. Table 1 shown below illustrates an example of load buckets that may be configured at the NRF for different NF types.

TABLE 1

| Configured Load Buckets per NF Type | | | |
| --- | --- | --- | --- |
| NF Type | Bucket 1 | Bucket 2 | Bucket 3 | Bucket 4 |
| NF Type 1 | 20-50 | 50-70 | 70-90 | 90-100 |
| NF Type 2 | 20-40 | 40-60 | 60-80 | 80-100 |

In Table 1, NF types Type 1 and Type 2 have different ranges of loading, specified as percentages of loading, for four different load buckets. If the load crosses a loading range associated with a load bucket, the last update timestamp for the NF profile will be updated, and the NF profile will be included in the audit response along with an NF registration update, if any. If the only update to an NF profile is a change in loading that does not cause the loading to move from its current load bucket into a new load bucket, the last update timestamp associated with the NF profile is not updated in response to the change in loading, which will reduce the likelihood of the NF profile being included in a timestamp-based NF profile retrieval API audit response. Thus, using load buckets reduces unnecessary NF profile synchronizations between the NRF and the SCP.

Figure 9:
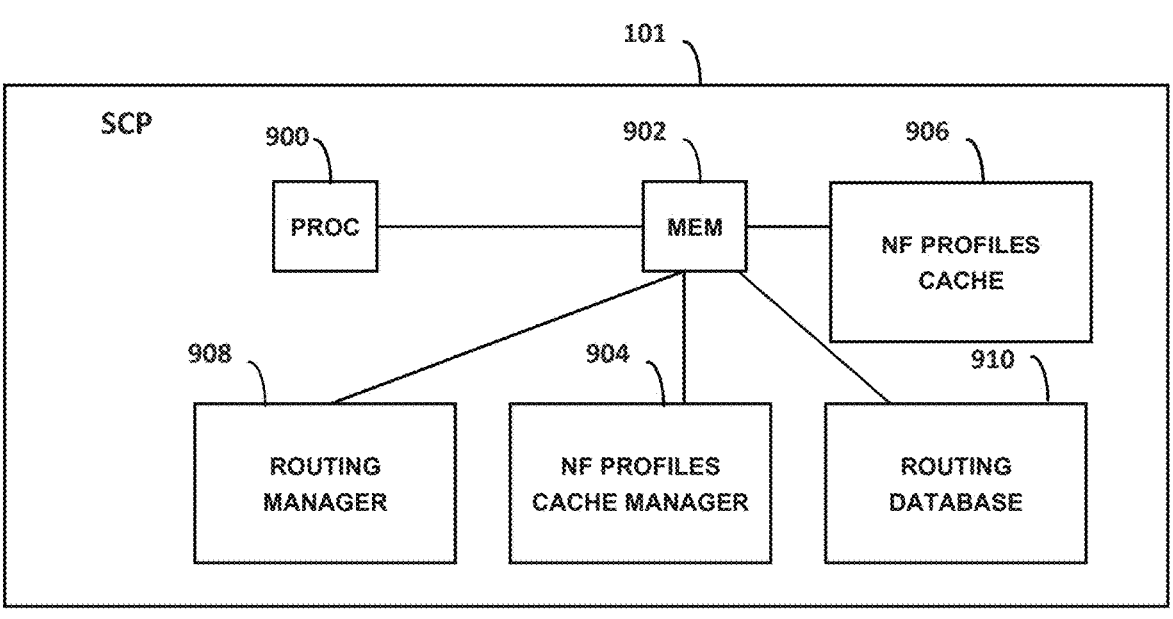
FIG. 9 is a block diagram illustrating exemplary architectures for an NRF and an SCP for providing for efficient auditing of NF profile information by SCPs.
Figure 9:
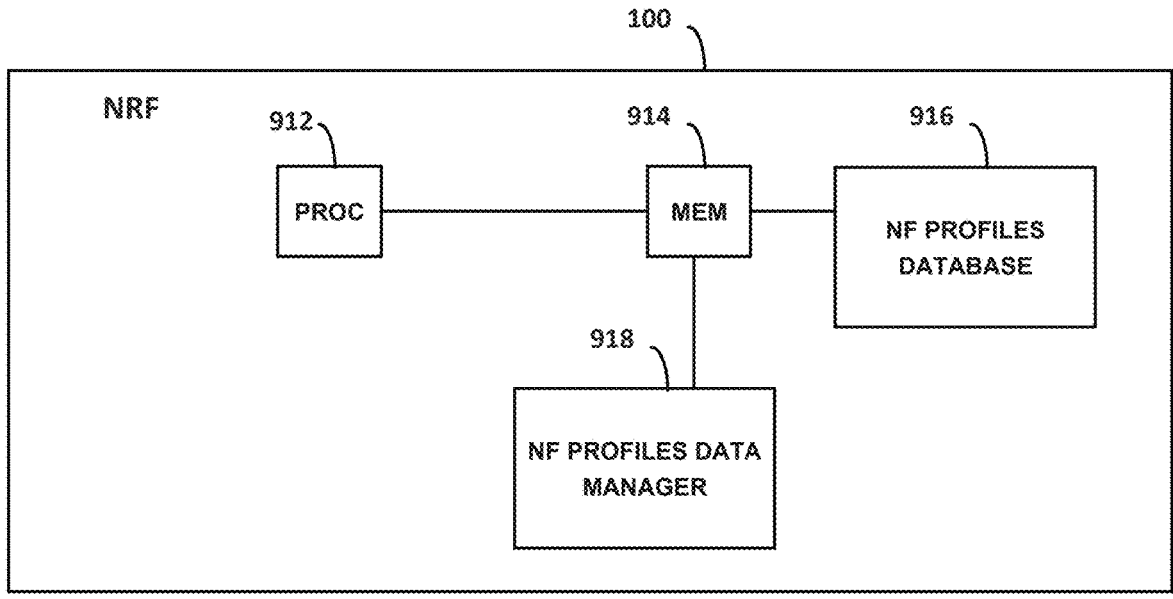

FIG. 9 is a block diagram illustrating exemplary architectures for an NRF and an SCP for providing for efficient auditing of NF profile information by SCPs. Referring to FIG. 9, SCP 101 includes at least one processor 900 and memory 902. SCP 101 further includes an NF profiles cache manager 904 that performs the steps described herein for obtaining updated NF profile information from the NRF and storing the updated NF profile information in NF profiles cache 906. SCP 101 further includes a routing manager 908 that routes SBI request messages using data stored in routing database 910. NF profiles cache manager 904 and routing manager 908 may be implemented using computer executable instructions stored in memory 902 and executed by processor 900.

NRF 100 includes at least one processor 912 and memory 914. NRF 100 further includes an NF profiles database 916 that stores the NF profiles of NFs that are registered with NRF 100. NRF 100 further includes an NF profiles data manager 918 that manages registrations, updates, and access to NF profiles in NF profiles database 916. NF profiles data manager 918 may also expose the timestamp-based NF profile retrieval API that allows SCP 101 to retrieve NF profiles that have been updated since the timestamp specified in the timestamp-based NF profile retrieval API message received from SCP 101. NF profiles data manager 918 may store and update the last update timestamps associated with the NF profiles in an NRF cache that is separate from the NF profiles. The NRF cache may be stored in memory 914 or in a separate memory. NF profiles data manager 918 may be implemented using computer executable instructions stored in memory 914 and executed by processor 912.

FIG. 10 is a flow chart illustrating an exemplary process for providing for efficient auditing of NF profile information by SCPs. Referring to FIG. 10, in step 1000, the process includes storing, by an NF repository function (NRF), NF profiles of producer NFs registered with the NRF. For example, an NRF, such as NRF 100, may allow producer NFs to register their NF profiles using the NF register service operation. The NRF may store such NF profiles in a database local to the NRF.

In step 1002, the process includes storing, by the NRF, a last update timestamp associated with each of the NF profiles. For example, an NRF, such as NRF 100, may maintain, for each NF profile in its NF profiles database, a timestamp indicating the last time that NF profile was stored or updated. In one example, the last update timestamp may be maintained in memory separate from the NF profiles. The NRF may update the last update timestamp when a substantial update, such as an NF update that replaces fields in the NF profile other than load, or an NF heart-beat that causes the load attribute value of an NF profile to exceed a range of load values associated with a load bucket, occurs.

In step 1004, the process includes providing, by the NRF, a timestamp-based NF profile retrieval application programming interface (API) that receives, as input, a timestamp, and that provides, as output, NF profiles associated with last update timestamps that indicate times that are after a time indicated by the timestamp received as input. For example, an NRF, such as NRF 100, may provide an interface by which a querying NF can specify a timestamp as a query parameter in a message that includes an HTTP GET method. If the timestamp is the only query parameter, the NRF will return all NF profiles in its NF profiles database that have been updated since the time indicated by the timestamp in the timestamp-based NF profile retrieval API message. If the timestamp-based NF profile retrieval API message includes query parameters in addition to the timestamp, the NRF will return NF profiles that have been updated since the time indicated by the timestamp and that have attributes that match the other query parameters.

In step 1006, the process further includes receiving, by the NRF and from an SCP via the timestamp-based NF profile retrieval API, a request message that includes a first timestamp. For example, an NRF, such as NRF 100, may receive a message including an HTTP GET method and including a timestamp as a query parameter.

In step 1008, the process includes generating, by the NRF, a response message that includes NF profiles for which last update timestamps indicate times that are after a time indicated by the first timestamp. For example, an NRF, such as NRF 100, may identify, using the last update timestamps stored for the NF profiles in its NF profiles database, those NF profiles that have been updated since the time indicated by the timestamp in the timestamp-based NF profile retrieval API message and include only those NF profiles in a 200 OK response message to be transmitted to the querying SCP.

In step 1010, the process includes transmitting the response message from the NRF to the SCP. For example, an NRF, such as NRF 100, may transmit, to the querying SCP, a 200 OK message including the NF profiles located in response to the query message.

Exemplary advantages of the subject matter described herein include an increased likelihood that the SCP's NF profile data will be synced with the NRF data, even if a notification drop occurs due to network issues/congestion. The efficient retrieval of NF profile data from the NRF also reduces the likelihood of a service outage/latency due to the SCP trying to route requests to incorrect or unavailable NF producers. The efficient auditing mechanism between the SCP and the NRF also reduces the number of messages and the quantity of data traversing the network. The efficient auditing mechanism also requires less processing and hence a reduced demand on resources of the NRF and the SCP, especially when syncing only the NF profiles that have been substantially updated since the last update.

The disclosure of each of the following references is hereby incorporated herein by reference in its entirety.

REFERENCES 1. 3$^{rd}$ Generation Partnership Project; Technical Specification Group Core Network and Terminals; 5G System; Network Function Repository Services; Stage 3 (Release 18) 3GPP TS 29.510 V18.6.0 (2024-03)
2. 3$^{rd}$ Generation Partnership Project; Technical Specification Group Services and System Aspects; System architecture for the 5G System (5GS); Stage 2 (Release 18) 3GPP TS 23.501 V18.5.0 (2024-03)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing for efficient auditing of network function (NF) profiles by service communication proxies (SCPs), the method comprising:
    storing, by an NF repository function (NRF), NF profiles of producer NFs registered with the NRF;
    storing, by the NRF, last update timestamps associated with the NF profiles;
    providing, by the NRF, a timestamp-based NF profile retrieval application programming interface (API) that receives, as input, a timestamp, and that provides, as output, NF profiles associated with last update timestamps that indicate times that are after a time indicated by the timestamp received as input;

receiving, by the NRF and from an SCP via the time-stamp-based NF profile retrieval API, a request message that includes a first timestamp;

generating, by the NRF, a response message that includes NF profiles for which last update timestamps indicate times that are after a time indicated by the first timestamp; and transmitting the response message from the NRF to the SCP.

2. The method of claim 1 wherein storing the last update timestamps includes storing the last update timestamps in an NRF cache.

3. The method of claim 1 comprising maintaining, by the NRF, a plurality of load buckets for the producer NFs registered with the NRF and updating the last update timestamps associated with the NF profiles when changes in loading of the producer NFs cause load values of the producer NFs to move between ranges of loading associated with the load buckets.

4. The method of claim 3 wherein maintaining the load buckets includes maintaining different ranges of loading per NF type.

5. The method of claim 3 comprising refraining from updating the last update timestamps associated with the producer NFs in response to changes in loading of the producer NFs that do not cause the load values to move between ranges of loading associated with the load buckets.

6. The method of claim 1 comprising updating the last update timestamps in response to NF profile updates from the producer NFs.

7. The method of claim 1 wherein providing the time-stamp-based NF profile retrieval API includes providing a custom representational state transfer (REST) API.

8. The method of claim 1 wherein receiving a request message via the timestamp-based NF profile retrieval API includes receiving a message including a hypertext transfer protocol (HTTP) GET method with the first timestamp as a query parameter.

9. The method of claim 1 wherein the first timestamp is equal to a time of a last audit request by the SCP.

10. The method of claim 1 wherein generating the response message comprises including, in the response message, only the NF profiles of the producer NFs for which the last update timestamps indicate times that are after a time indicated by the first timestamp.

11. A system for providing for efficient auditing of network function (NF) profiles by service communication proxies (SCPs), the system comprising:

an NF repository function (NRF) including at least one processor and a memory;

an NF profiles database embodied in the memory for storing NF profiles of producer NFs registered with the NRF; and an NF profiles data manager implemented by the at least one processor for storing last update timestamps associated with the NF profiles, providing a timestamp-based NF profile retrieval application programming interface (API) that receives, as input, a timestamp, and that provides, as output, NF profiles associated with last update timestamps that indicate times that are after a time indicated by the timestamp received as input, the NF profiles data manager for receiving, from an SCP, a request message via the timestamp-based NF profile retrieval API and that includes a first timestamp, generating a response message that includes NF profiles for which last update timestamps indicate times that are after a time indicated by the first timestamp, and transmitting the response message to the SCP.

12. The system of claim 11 wherein the NF profiles data manager is configured to store the last update timestamps in an NRF cache.

13. The system of claim 11 wherein the NF profiles data manager is configured to maintain a plurality of load buckets for the producer NFs registered with the NRF and update the last update timestamps associated with the NF profiles when changes in loading of the producer NFs cause load values of the producer NFs to move between ranges of loading associated with the load buckets.

14. The system of claim 13 wherein the NF profiles data manager is configured to maintain different ranges of loading per NF type.

15. The system of claim 13 wherein the NF profiles data manager is configured to refrain from updating the last update timestamps associated with the producer NFs in response to changes in loading of the producer NFs that do not cause the load values to move between ranges of loading associated with the load buckets.

16. The system of claim 11 wherein the NF profiles data manager is configured to update the last update timestamps in response to NF profile updates from the producer NFs.

17. The system of claim 11 wherein the timestamp-based NF profile retrieval API includes a custom representational state transfer (REST) API.

18. The system of claim 11 wherein the request message received via the timestamp-based NF profile retrieval API includes a hypertext transfer protocol (HTTP) GET method with the first timestamp as a query parameter.

19. The system of claim 11 wherein the first timestamp is equal to a time of a last audit request by the SCP.

20. A non-transitory computer readable medium having stored thereon executable instructions that when executed by a processor of a computer control the computer to perform steps comprising:

storing, by a network function (NF) repository function (NRF), NF profiles of producer NFs registered with the NRF;

storing, by the NRF, last update timestamps associated with the NF profiles;

providing, by the NRF, a timestamp-based NF profile retrieval application programming interface (API) that receives, as input, a timestamp, and that provides, as output, NF profiles having last update timestamps that indicate times that are after a time indicated by the timestamp received as input;

receiving, by the NRF and from a service communication proxy (SCP), a request message via the timestamp-based NF profile retrieval API and that includes a first timestamp;

generating, by the NRF, a response message that includes NF profiles for which last update timestamps indicate times that are after a time indicated by the first timestamp; and transmitting the response message from the NRF to the SCP.

* * * * *